Figure 1:
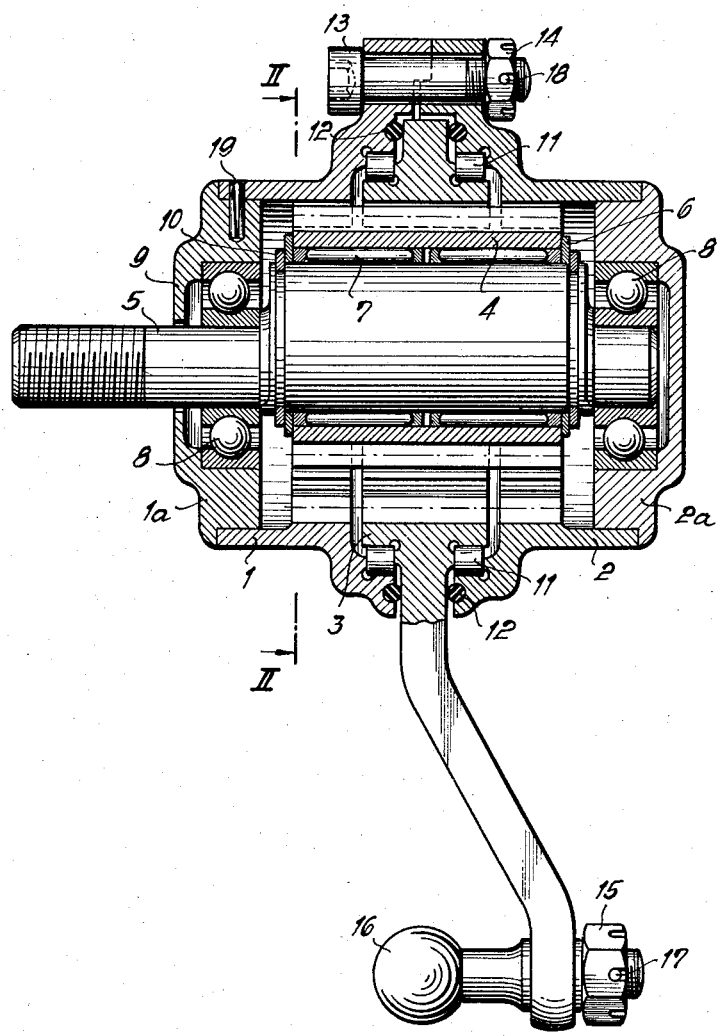

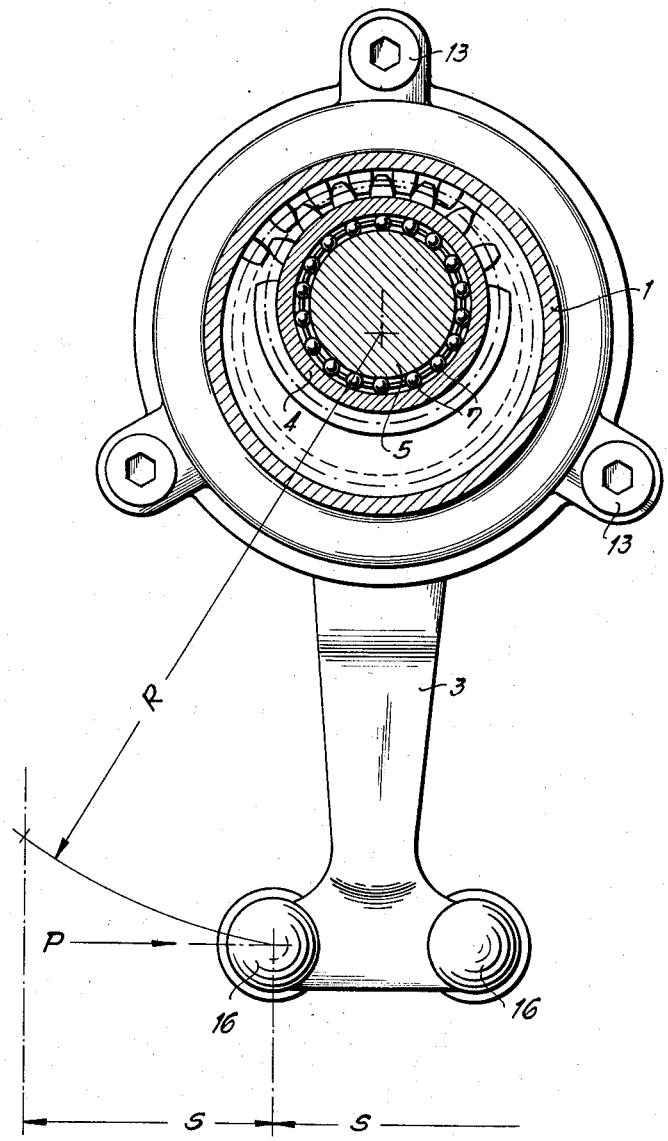

United States Patent Office 2,838,952
Patented June 17, 1958

2,838,952

STEERING GEARS OF ALL KINDS, ESPECIALLY FOR MOTOR DRIVEN VEHICLES

Kurt Seeliger, Muschede, Kreis Arnsberg, Germany, assignor to the joint heirs of Georg Puls, represented by (Mrs.) Gerdi Puls, Burgkunstadt, Oberfranken, Germany Application August 26, 1954, Serial No. 452,369

Claims priority, application Germany August 29, 1953

4 Claims. (Cl. 74—498)

This invention relates to gear arrangements, and more particularly to a steering gear especially for motor driven vehicles.

The gear arrangement which, particularly in the case of motor driven vehicles, reduces the rotary movement of a steering wheel to the turning movement of a steering lever desired for the movement of a steering rod, will hereinafter be referred to shortly as "steering gear."

The steering gears employed today in motor driven vehicles are mostly constructed as worm steering gears. The turning of the worm is caused by the steering wheel, whilst the steering lever setting the steering rod in motion is actuated by a nut, a nut section or a worm wheel segment. This arrangement no longer satisfies the greater demands for freedom from play and friction when the necessary steering forces increase with the size of the vehicle. It has therefore been supplemented by roller teeth steering gears in which the worm is retained in principle whereas the steering lever carries on its driving end a finger, usually mounted in roller bearings, which engages in a worm profile. Thus, the frictional resistance could be considerably reduced; as, however, the transmission of power between the worm and the finger, which only have line contact, is only possible by surface deformation, the construction requires large surfaces for the worm and finger. On account of the circular shaped track of the finger, the worm profile must be symmetrical to the zero position of the steering gear corrected with increasing distance from this zero position; the demand for considerable freedom from play requires increased precision in the manufacture of this worm profile.

In addition to the worm steering gears, toothed wheel steering gears of different constructions have been developed. Amongst these, rack steering gears have primarily prevailed for smaller vehicles. In these rack steering gears the steering wheel turns a pinion which engages in a straight-guided toothed rack. In order to attain the speed reduction determined by the remaining construction, pinions must be used with a very small number of teeth. Consequently, this steering gear is restricted to small vehicles and on account of the small degree of overlap the pinion and rack must be hardened. The hardening, particularly in the case of the rack, presents difficulties on account of the unsymmetrical cross section of the same. For greater steering forces two-step spur wheel gears have been proposed in the Swiss patent specification No. 262,696, in which the last wheel which drives the actual steering lever is constructed as a segment so as to save space. The two-step construction gives the steering gear greater initial play, primarily on account of the necessary tooth flank clearance, and offers so important advantages as regards the shape of the coupled parts. In the German patent specification No. 717,517 an epicyclic gear is suggested in which the planets are two-piece wheels and mutually resiliently braced, in order to step-down suppress the tooth clearance or idle motion. The arrangement is unsuitable for a steering gear because the necessary step-down transmissions can only be attained with awkward dimensions. Further, this proposed epicyclic gear belongs to the class of non-compensating epicyclic gears; it is characterized by a very good degree of efficiency even in the case of drive from the slow side. This, however, is disadvantageous for suppressing as far as possible road shocks and also indicates that, in the case of slight correction deflections on the steering wheel when travelling straight ahead, very closely adjacent portions of the steering lever and the driving gear member cooperate force-locked; that means, however, that these portions will wear most because the force-locking points which are used in negotiating curves come into action much less frequently. In the French patent specification No. 470,053 an epicyclic gear is also proposed which does not have this disadvantage as compensating gear. Herein the maximum relative movement which is possible between the steering lever and the driving member is utilized and the wear, with the same amount of correction on the steering wheel as above, is distributed over a considerably larger range and consequently ensures appreciable resistance to wear. Whereas namely in the case of the two-step spur wheel steering gear for example a toothed segment on the drive side is sufficient, in this construction the steering lever must have complete internal toothing which will be ridden over at each rotation of the steering wheel. A peculiarity of this type of gear is that the tooth forces, caused by the loading on the drive side, occur in substantially the same magnitude in all the toothed systems. Thus, in particular, oppositely directed, approximately uniform tooth forces act on the toothed systems 5 and 4 in the patent specification mentioned, which forces lead to a tipping or canting of the entire toothed-system combination because idle motion or play, due to production and function, must be present in the bearings between elements 1 and 8, 3 and 5 plus 4, and also elements 8 and 2 and 1 and 2. This tipping or canting for example of the toothing 4 in the inner toothing 6 means, however, that positive connection or contact over the tooth width illustrated is absolutely impossible. The gear must develop backlash or play after a short time owing to wear in the toothed system, which will render it useless as a steering gear. Moreover, the production of the four toothed portions illustrated is only possible on shaper hobbing machines and thus the production is not particularly advantageous as compared with the worm steering gear. The type of gear in the arrangements illustrated in the French patent specification must, owing to the concentricity of the tooth systems 4 and 5, show the same differences in the number of teeth between the inner toothing 11 and the outer toothing 5 on the one hand and the inner toothing 6 and the outer toothing 4 on the other hand. It has already been pointed out in the French patent specification that the effective reduction ratio transmission is only determined by the size of the tooth systems. As the reduction required for steering gears is laid down within narrow limits, the necessary size of wheel can be easily determined. It is found that there must be a considerable difference in the number of teeth between the wheels 4 and 5 in order to come within the correct range of the ratio of transmission reduction. This, however, will result in clumsy constructional shapes which must be rejected already from the point of view of space but which also have disadvantages as regards loading.

The object of the present invention is to provide a steering gear that constitutes a further development of the steering gear described in the French patent specification above mentioned and in which the disadvantages set forth are avoided by constructional measures.

The novel feature of the invention consists in that the fixed inner toothing is fitted in two halves on the two sides of the inner toothing on the steering lever side. In order to avoid tipping moments on the driving eccentric shaft, which otherwise occur, the corrections in the number of teeth necessary for compensation on the reduction transmissions required of steering gears are effected in such manner that, for a given difference between the teeth of the inner tooth system, the difference in the number of teeth between the external tooth systems of the planets meshing with the inner tooth systems is reduced, in the extreme case until the number of teeth in these external tooth systems is equal. Advantageously, the actual steering lever is not rigidly connected with the internal toothing which drives it, but is connected by a known safety slip clutch.

In the drawings:

Fig. 1 is a longitudinal section through a steering gear according to the invention, and Fig. 2 is a cross section on line II—II of Fig. 1.

The steering gear according to the invention consists of a housing composed of two halves 1 and 2 with internal toothing or teeth and two bearing covers 1a and 2a equipped with ball bearings 8. For sealing the passage of an eccentric shaft 5 a rotary disk 9 is provided. A needle bearing 7 carries a gear wheel element 4. Circular disks 6 serve for securing the gear wheel element 4 against axial displacement. These circular disks 6 are fixed by Seeger rings 10. Roller bearings 11 serve for mounting a driving or steering lever 3 in the two housing halves 1 and 2 provided with internal toothing. The steering lever 3 is sealed against the two housing halves by packing rings 12. Fixing bolts 13 in the form of fitted bolts serve for connecting the two housing halves 1 and 2 with the aid of nuts 14 and splints 18. Ball-shaped heads 16 with nuts 15 and cotter pins 17 serve for articulation of connecting or track rods. Splined pins 19 serve for securing the bearing cover in the housing halves.

The operation of the gear arrangement causes the steering lever 3 to turn in its roller bearings 11 when the driving eccentric shaft 5 is rotated, in that the gear wheel element 4, mounted in the needle bearing 7, rolls in the two inner tooth systems fixed in the housing. The gear wheel element 4 carries the steering lever with its internal toothing with it along a differential path which is dependent upon the number of teeth chosen for the internal tooth systems. In spite of the different number of teeth, the two internal tooth systems cooperate with the gear wheel element 4 with continuous uniform flank profile. The shaping of the internally toothed parts takes into consideration that these parts can be broached. Both measures serve for improving the economy of the production. As the steering gear produced according to the invention has no zero position like, for example, a worm steering gear, but can rotate as often as required or desired, it is possible to connect the steering lever and its driving internal toothing by means of a known slip clutch. By the arrangement of the internal toothing fixed in the housing in two halves on the right and the left of the internal toothing of the steering lever the pitching moments on the gear wheel element 4 disappear. Thus under load perfect support is rendered possible in the tooth flanks and the advantages which result from the cooperation of the convex external teeth of element 4 with the concave internal teeth of housing portions 1 and 2 on the one hand and lever 3 on the other hand can be utilized to their full extent.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A steering gear comprising a drive shaft, cam means on said drive shaft, an externally toothed cylindrical member surrounding said cam means in eccentrical relationship with the axis of said shaft and adapted to be rotated about said axis by said cam means upon rotation of said shaft, said member having a central toothed zone and a pair of lateral toothed zones flanking said central zone, a housing comprising a pair of internally toothed cylindrical portions concentrically surrounding said axis and meshing with said lateral toothed zones, respectively, an internally toothed cylindrical collar rotatably positioned intermediate said housing portion, said collar concentrically surrounding said axis and meshing with said central toothed zone, a steering lever, and coupling means operatively linking said lever with said collar.

2. A steering gear according to claim 1, wherein said collar has a number of teeth different from that of each of said housing portions.

3. A steering gear according to claim 1, wherein said coupling means includes a slipping clutch.

4. A steering gear according to claim 1, wherein the outer diameters of all of said zones of said externally toothed member are the same.

References Cited in the file of this patent

UNITED STATES PATENTS

| | | |
|---|---|---|
| 1,573,586 | Stone | Feb. 16, 1926 |
| 2,251,167 | Probst | July 29, 1941 |
| 2,453,949 | Ulinski | Nov. 16, 1948 |

FOREIGN PATENTS

| | | |
|---|---|---|
| 470,053 | France | June 6, 1914 |